Figure 1:
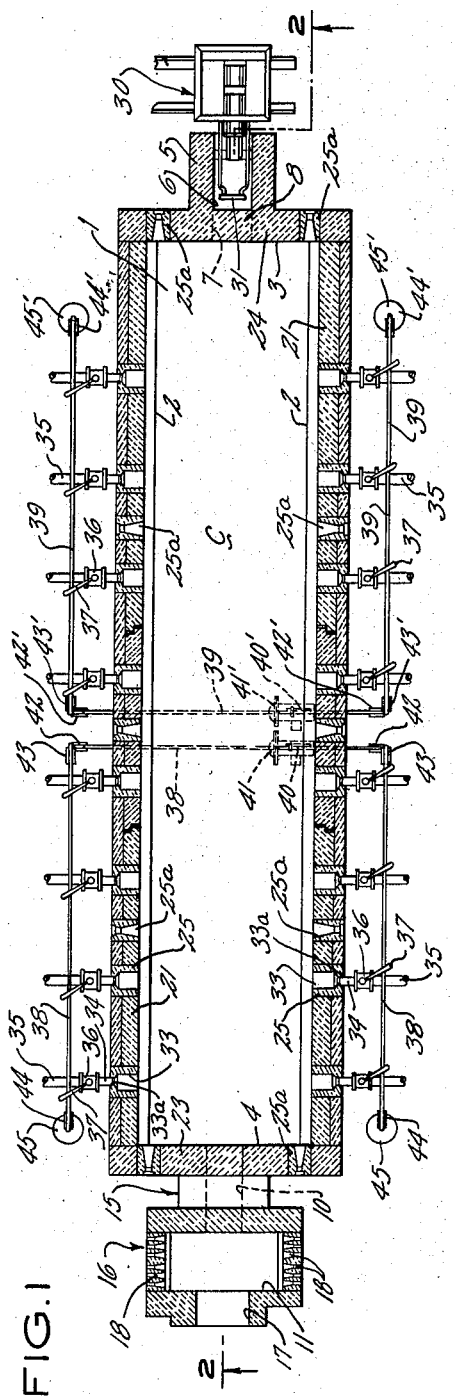

June 16, 1959 A. K. LYLE 2,890,547
APPARATUS FOR AND METHOD OF MAKING GLASS
Filed Nov. 10, 1951

INVENTOR
AARON K. LYLE
BY Parham + Bates
ATTORNEYS

United States Patent Office 2,890,547
Patented June 16, 1959

2,890,547
APPARATUS FOR AND METHOD OF MAKING GLASS

Aaron K. Lyle, West Hartford, Conn., assignor to Emhart Manufacturing Company, Hartford, Conn., a corporation of Delaware Application November 10, 1951, Serial No. 255,833

4 Claims. (Cl. 49—54)

This invention relates to improvements in apparatuses for and methods of making glass and more particularly to a small continuous glass melting furnace having a daily productive capacity sufficient only for the requirements of a single or a few glassware forming machines or other glass using units or operations and to a novel method of making glass to supply such requirements.

Glass melting furnaces in general use in the glass industry have large daily productive capacities, typically seventy tons or more in the case of a furnace in a glass container plant and even more in the case of a furnace in a sheet glass plant. Such a typical glass container plant furnace is about twenty-two feet in length and about eighteen feet wide. These large furnaces have many disadvantages inherent therein because of their massive structures, heating requirements, operating characteristics, etc. They are costly to install and to maintain and are relatively inefficient unless operated at about their rated capacities. Their inefficiency increases with reduction of output below their rated capacities. They impose undesirable limitations on plant layout plans, factory production schedules, diversity of articles produced, etc. Also, the production loss necessarily is large when such a large capacity furnace is out of operation for any reason, as for rebuilding or repairs, and the cost of changing over from one glass to a different glass is relatively high.

The above recited and other disadvantages of the existing large capacity glass furnaces of the prior art indicate a need which has been long felt for a relatively small or low capacity continuous glass melting furnace adapted for operation to supply the glass requirements of but a single or a few glassware forming machines or other glass using units. Despite this need for a small capacity furnace, the usual condition that exists in the glass industry today is that a large furnace must be operated at low efficiency and in a costly, uneconomical way when it becomes necessary to make glass at the low rate appropriate to supply the glass requirements of only one or a few glass-using units. There have been a number of attempts prior to the present invention to make small capacity glass melting furnaces but I know of none that has been acceptable to the industry for general use or sufficiently efficient to satisfy the existing need.

A object of the present invention is to provide a moderate cost continous glass melting furnace of small daily capacity, suitable for the purpose and competitive with larger furnaces in overall operating efficiency.

Another object of the invention is to provide a practical, efficient method by which to make and supply glass of uniformly good quality at a sufficiently low rate of production to take care only of the requirements of a single or a few glassware forming machines or other glass using units or operations.

The problem of providing a small capacity or "unit" size continuous glass melting furnace adapted for satisfactory operation to produce molten glass of uniformly good quality at a cost competitive with the large melting furnaces of the prior art presents many difficulties. It is generally true that the larger the furnace the less fuel required per ton of glass produced, provided the furnace is operated at about its rated capacity. A substantial part of the total heat required per ton of glass supplied by a furnace is used to maintain the molten glass reserve or bath therein and the furnace walls suitably heated for the glass making operation. When glass batch is added to the bath as required, more heat is supplied to melt the added batch and to fine the glass freshly melted therefrom. In the typical existing large furnace of the prior art, the glass holding chamber of the furnace is nearly as wide as it is long. Glass batch is added to the bath at one end of the chamber and is melted and refined therein before passing through a submerged throat passage at the opposite end to a conditioning chamber or "nose" of the furnace. In the operation of this furnace, the percentage of fuel cost for furnace maintenance to the total fuel cost of glass per ton produced decreases as the furnace output increases. The greater the furnace output the less the fuel required per ton of glass.

In view of the foregoing and other applicable considerations, the problem with which the present invention is concerned cannot be solved by mere reduction of width of the existing large capacity furnace chamber, nor by reduction of its length. Melting of the added batch and fining of the freshly melted glass require substantial time and hence space in which the batch and freshly melted glass may move while subjected to suitable heat conditions. In the existing large furnace, the batch melting zone extends from the charging end for approximately half the length of the chamber and the fining zone extends for the remaining half although the melting and fining operations overlap somewhat and are not limited to such precisely defined zones. It is customary to supply the greater part of the total fuel input of such a furnace to its melting zone.

The present invention provides a practical solution of the problem referred to by combining furnace structural, firing and batch charging provisions which individually considered would seem to oppose rather than aid such solution but which by their cooperative, co-acting functioning and effects produce the desired overall result. This will now be briefly explained.

The invention provides a long, narrow horizontal furnace chamber or channel having a ratio of length to width far in excess of that of the existing large capacity furnaces, and a total length of melting and refining zones correspondingly greater. These features would bring about a substantial increase rather than decrease of fuel consumption per ton of glass produced if the firing and batch charging provisions and practices of the prior art were employed. However, they also afford a basis for adequate saving when the firing provisions and operations of the present invention are used. These comprise adjustable fuel burners located at appropriate intervals along each side wall of the furnace channel and operation thereof to effect input to the forward or fining zone of the greater part of the total fuel input, a place of maximum temperature, i.e., the so-called "hot spot," at a location well forward in the fining zone, and a lower temperature in the rear or melting zone with a temperature down-gradient rearwardly from the hot spot to the charging end of the channel where a stack is provided to exhaust the waste products of combustion and gases.

This manner of firing, while it provides the desired fuel saving and is suited for cooperation with the long, narrow furnace channel to produce an improved batch melting and glass fining action and overall result, has the inherent disadvantage of tending to cause a rearward convection movement of the surface portion of the glass bath from the hot spot toward the rear end of the channel where batch is to be charged. The glass in the charging end and in the communicating charging bay or doghouse tends to become relatively cool and sluggish because of heat loss to the adjacent walls and relative remoteness from the firing means. Batch added thereto as required has a further cooling effect. Now if a rearward surface convection movement of glass to the rear end of the channel and into the doghouse should be permitted, forward movement of the batch would be prevented or retarded and the batch would pile up and accelerate the cooling of the underneath glass. In consequence, the whole glass making operation would be seriously impaired or prevented. This result cannot be obviated by pushing the charged batch forward on the glass surface counter to the rearward convection current. The invention therefore provides for charging of the batch with an attendant forward impelling action on the supporting glass so as to overcome the tendency toward a rearward convection current and to create instead a forward surface movement of the glass effective to advance the charged batch and supporting glass for the desired batch melting action and so as to permit batch charging at a satisfactory rate. The batch charging means and method of my U.S. Patent No. 2,533,826, granted December 12, 1950, produce the desired batch charging and forward glass impelling action and are preferred by me since they further aid attainment of the objects of the present invention by enfolding small portions of the batch within the top layer of the molten glass bath, thus providing for use of the heat of the bath to best advantage in the glassmaking operation.

Figure 2:
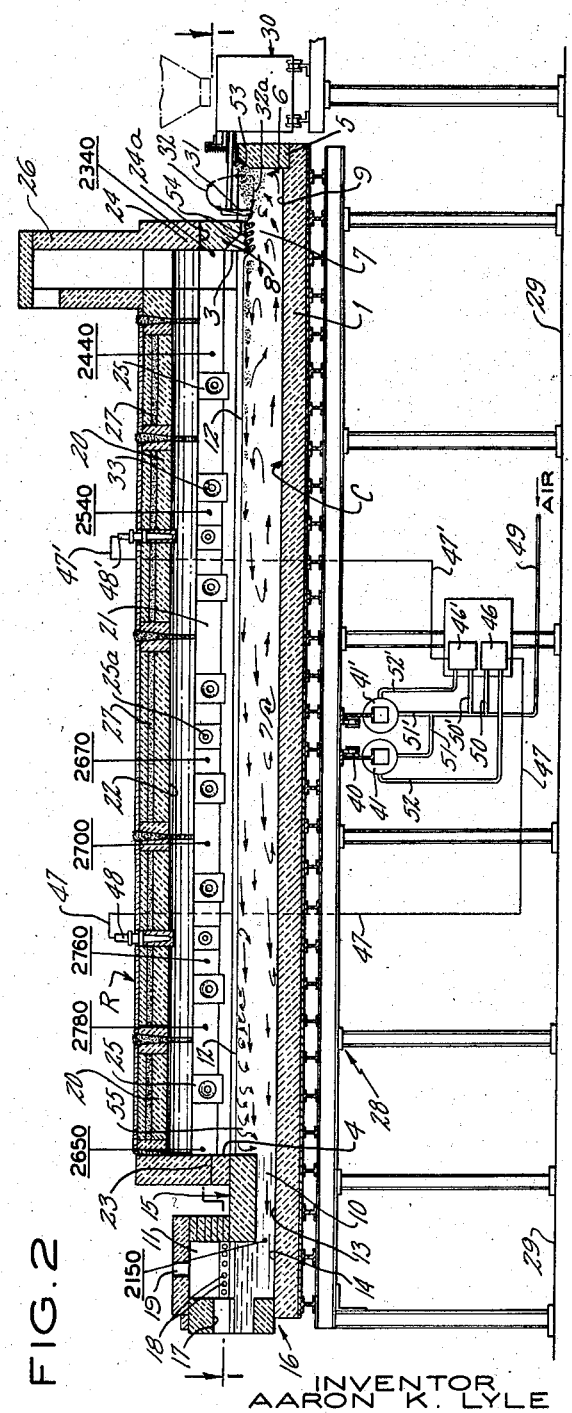

Further objects and advantages of the invention hereinafter will be pointed out or will become apparent from the following description of a practical embodiment of the invention as shown in the accompanying drawings in which:

Fig. 1 is a generally horizontal section through the structure of the illustrative embodiment at the line 1—1 of Fig. 2, certain elements being only partially shown and the showing of others being somewhat diagrammatic; and, Fig. 2 is a longitudinal vertical section through the structure at the line 2—2 of Fig. 1 showing the glass reserve or bath in the apparatus diagrammatically by a straight horizontal line indicating its surface level and by direction arrows indicating currents therein and further illustrating the charging of batch to and forward propulsion of the charged batch and surface layer of the glass batch at the charging end of the furnace.

The illustrative apparatus shown in the drawings comprises a relatively long and narrow horizontal furnace channel, generally designated C, comprising a horizontal, flat bottom or hearth 1, a pair of longitudinal side walls 2—2, an end wall 3 at the rear or charging end and a front end wall 4 at the opposite or delivery end of the channel.

A doghouse 5 has a chamber 6 opening at 7 beneath a mantel block 8 into the rear end of the furnace channel intermediate the width of the latter. The doghouse chamber 6 has a bottom 9 which is shown as at the same level as the channel bottom 1 and may be a rearward extension of a middle portion of the latter.

The front end of the furnace channel is in open communication at its middle portion with a horizontal throat passage 10 leading to the lower part of a glass conditioning chamber 11, the throat passage being located below the level 12, Fig. 2, of the surface of the glass in the furnace channel and in the connected conditioning chamber. The floors of the furnace channel, throat passage and conditioning chamber may all be at the same level and the bottom 13 of the throat passage may be a continuation of a portion of the channel bottom 1 and the bottom 14 of the conditioning chamber may be a laterally enlarged forward extension of the bottom 13 of the throat passage. The throat passage and the conditioning chamber are otherwise defined by structures indicated generally at 15 and 16, respectively, cooperative with their respective bottoms and formed in any suitable known manner of suitable known parts and materials. In the example shown, the conditioning chamber structure has an opening 17 in a vertical wall opposite the throat and appropriate for outflow of glass to a glass feeder forehearth (not shown) or the like and the conditioning chamber is provided with independent heating means represented by the burner ports 18 in opposite side wall portions of the chamber structure and with an exhaust opening or vent 19 in a top portion of that structure. The details of the example are not intended to be limiting as the conditioning chamber may be of any suitable size, shape and known construction and may be provided with more than one glass outflow opening or adapted for removal of glass therefrom by hand gathering or in any other known way.

The furnace structure includes a roof or top section, generally designed R, Fig. 2, comprising a transversely arched crown 20, supported at its side edges on longitudinally extending vertically narrow side wall tiers or sections 21, 21, which respectively rest on the upper surfaces of the furnace channel side walls 2, 2. This structural arrangement provides a low combustion or heating space 22 above the surface 12 of the glass in the furnace channel and extending longitudinally thereof from a transversely extending front closure wall 23 to a similar rear closure wall 24. The front transverse wall 23 may be an integral upward continuation of the channel front end wall 4 or may be provided thereon in any suitable known manner. Similarly, the rear transverse wall 24 may be an integral upward extension of the channel rear end wall 3 or provided theeron in any other known way. The rear wall 24 may be partially cut away at its bottom at 24a over the doghouse chamber outlet 7 to accommodate the mantel block 8.

The longitudinal side wall sections 21 just above the channel side walls include burner blocks 25. These may be of any predetermined suitable number and they may be spaced apart longitudinally of the furnace heating space as deemed best for the furnace heating action and result desired. The furnace top structure includes a stack 26 in open communication at its bottom with the furnace space 22 at the extreme rearward end of the latter, i.e., just above the portion of the furnace channel C into which the doghouse chamber opens. In the example shown, eight equidistantly spaced apart burner blocks 25 are provided in each of the longitudinal side wall sections 21 with corresponding burner blocks in the two side wall sections directly opposite each other and with the foremost burner blocks slightly nearer the front transverse closure wall 23 than the distance between adjacent burner blocks in the same side wall and with the rearmost burner blocks about the same distance forwardly from the vertical plane of the front of the stack bottom opening as the distance between adjacent burner blocks. As above indicated, different relative locations of burner blocks and different numbers of burner blocks may be provided in other furnace structures embodying the invention.

Peep hole blocks 25a may be provided at desired places in the side and end closure walls of the furnace combustion and heating space.

The furnace walls may be formed of suitable refractory material or materials and heat insulation, such for example as is indicated at 27 in the furnace crown, may be included therein or applied thereto at the place or places desired.

A supporting frame structure, as indicated as a whole at 28 in Fig. 2 may be provided to support the furnace and connected parts at a desired height above a factory floor or other main supporting surface 29.

A batch charger shown more or less diagrammatically at 30 is operatively associated with the doghouse 5. This charger preferably is that disclosed in my Patent No.

2,533,826 of December 12, 1950, and it includes a glass stirring and impelling implement or rabble 31 moved along an orbital path 32, Fig. 2, lying in a vertical plane and having a lower forward portion 32a such that the implement dips to a predetermined desirable depth in the portion of the glass bath in the doghouse chamber and impels glass of the surface layer of the bath forward so as to oppose and overcome a tendency to a rearward convection current at the surface of the glass bath. The action of the charger implement and the result thereof will be further explained hereinafter in a description of the operation of the furnace and of the method of the invention performed thereby.

The burner blocks 25 are formed so that a burner port 33 extends through each from its outer to its inner face, such port having a reduced outer end portion 33a into which the discharge end of a fuel nozzle 34 projects. The wall of the reduced end portion of the burner port may have an airtight fit with the exterior of the inserted portion of the nozzle if, as is preferred, the fuel supplied thereto is a suitable premixture of air and combustible gaseous or liquid fuel. The remaining major portion of each burner port may be considerably larger in cross-section as shown to promote combustion in the burner port and at the inner face of the burner block. A fuel supply pipe 35 leads to each burner 34 and is provided with an adjustable valve 36 having an adjusting handle 37.

The fuel supply pipes 35, which are shown broken away near the furnace structure, may be supplied with fuel, such as a premixture of air and gas or oil, from any suitable source.

The individual adjustments of the burner valves by their handles 37 permit predetermination and selection of the fuel input through each burner port to the furnace combustion or heating space and hence predetermination and selection of the temperature and conditions to be established and maintained in the furnace for desired glass melting and refining operations. The temperature gradient in the furnace contemplated by the present invention thus may be varied best to suit the requirements for different compositions of glass and for different production requirements.

The invention further contemplates simultaneous adjustment if desired of the fuel inputs from the individual burners or from groups of them after the burners have been individually adjusted. Thus, the adjusting handles 37 for the burners applied to both sides of the forward approximate longitudinal half of the furnace may be operatively connected together by a common movable actuating member 38 by which they may be adjusted in unison to increase or decrease their individual fuel inputs as required while maintaining the preselected differentials between such inputs. Similarly, the adjusting handles of the burners applied to both sides of the rear longitudinal half portion of the furnace may be connected together by a movable actuating member 39 for adjustment in unison. The actuating member 38 is a cable connected at an intermediate point to a movable power applying element 40. This is the movable element of a pneumatic motor 41 located beneath the furnace and is shifted in a direction transverse of the furnace structure by the operation of pneumatic motor 41. The portions of the cable 38 extending oppositely from the pneumatic motor 41 are guided and supported by suitable pulleys, including those indicated at 42, 43 and 44 shown at opposite sides of the furnace in Fig. 1 and the ends of the cable carry depending weights 45 which keep the portions of the cable extending between such weights and the actuating element 40 of the pneumatic motor constantly in tension. Operations of the motor 41 may be effected when required under the control of a suitable control mechanism 46, Fig. 2. This is operatively connected, as by a wire indicated at 47 with a thermoresponsive unit 48 provided in the crown of the furnace so as to respond to temperature changes at a predetermined point in the forward or fining zone portion of the furnace heating space.

Air from a suitable supply pipe 49 has a branch 50 leading to the controller 46 and another branch 51 leading to the pneumatic motor 41. The pneumatic motor 41 is operatively connected by an air pipe 52 with the controller 46. The arrangement is such that when the temperature at the lower end of the temperature responsive unit 48 varies appreciably from a predetermined temperature for which control mechanism 46 has been set, the pneumatic motor 41 will be operated to act through the common adjusting member 38 to adjust the individual valves for the respective burners in unison in the direction required to restore the desired temperature at the lower end of the unit 48 and hence act to restore the temperature gradient in the forward or fining zone portion of the furnace combustion space. The cable 39 is similarly supported and operated, the elements of the mechanism involved being like those pointed out for the cable 38 and being identified in the drawings by the same reference numerals primed. The temperature responsive unit 48' which acts through the controller 46' to control the pneumatic motor 41' is located at a predetermined point in the furnace crown above the rear or melting zone half of the furnace combustion space. As indicated by Fig. 2, both these temperature responsive units 48 and 48' may be in the longitudinal median portion of the furnace crown. The control means for adjusting a plurality or group of individual burners in response to temperature changes at a reference point does not per se form part of the present invention and hence is shown diagrammatically. Any suitable known or preferred control system for this purpose may be employed.

It hereinbefore has been pointed out that the furnace channel is relatively long and narrow and that the ratio of length to width thereof is far above that found in the large capacity commercial glass melting furnaces. In the particular structural example shown, the furnace channel represented has an internal length of 36 feet and a width of 6 feet, and hence the ratio of length to width is 6 to 1. The maximum length of such a furnace channel is approximately 40 feet and the minimum approximately 20 feet. The width may vary from 8 to 4 feet, the ratio of length to width being kept within the limits 4 and 7. The depth of the channel is designed for operation with glass therein to a depth of not more than half the width of the furnace channel. This may vary according to the size of a particular furnace, its daily production requirements, etc. A glass depth of 16 to 20 inches is preferred.

In operation, the fining zone, i.e., the forward approximate half portion of the furnace, is fired to maintain the desired fining temperature with the hot spot located well toward the front end of that zone. The rearward or melting zone portion is fired to cooperate with the firing of the fining zone to maintain a temperature drop from the front to back of 10° F. or more per foot of length, the gradient being determined by the temperature required at the hot spot for satisfactory fining in the fining zone and the minimum temperature at the rearward end of the melting zone that will effect melting and permit satisfactory charging of batch. The firing and the temperature down-gradients may be varied for optimum melting and refining results with different compositions of glass and in furnaces of different lengths and other dimensions or the same furnace operating to supply different amounts of glass daily. In a typical operation for the making of an ordinary soda-lime glass by use of the furnace shown in the drawings, glass of uniformly good quality was produced at a cost low enough to be commercially competitive with the large capacity conventional furnaces by operating the firing provisions to produce a hot spot of about 2780° F. in the combustion space of the front or fining zone at a point intermediate the front and second burners as shown in Fig. 2 and other temperatures as noted at different points along the length of the furnace from the exit end of the throat passage at the front to the exit end of the batch charging passage at the bottom entrance to the stack passage in the rear. The gases in the stack will be at a still lower temperature and will be discharged from the stack at a temperature in the order of 200 to 300° F. lower than in conventional regenerative furnaces. The temperatures at the surface of the glass in the furnace channel will approximate the temperatures at points directly overhead in the furnace heating space. The temperatures noted in Fig. 2 for different points in this space thus are generally indicative of temperatures at directly underneath points on the glass surface.

As hereinbefore has been indicated, the temperature down-gradient from the hot spot to the charging end of the furnace tends to produce a convection flow of surface glass in the same direction. This creates a problem which is overcome in carrying the invention into effect by use of the so-called "enfolding batch charger" of my Patent 2,533,826. The movable glass stirring tool or rabble 31 of this charger is moved in a vertical plane clockwise along the endless path 32, Fig. 2, having a lower portion 32a such that during movement of the rabble therealong it dips into the glass in the doghouse to a predetermined depth, two inches, for example, and exerts a forward propelling force on the glass it encounters sufficient to overcome the tendency toward rearward convection flow of surface glass produced by the temperature down-gradient from the hot spot to the charging end of the furnace. Batch which, in the operation of the charger 30, is deposited on the glass in the doghouse at the rear of the path of forward glass propelling movement of the rabble as indicated at 53 in Fig. 2, is caused to move forward by the action of the rabble into the pocket in the glass stream created by the rabble so as to be infolded in successive increments as indicated at 54. The force applied to the viscous glass of the bath by the forward strokes of the rabble will create a forward movement thereof as indicated by the straight line of arrows near the glass surface level in Fig. 2 and the infolded increments of batch will be propelled or moved forward with this surface glass, gradually being reduced to freshly melted glass as their forward movement continues. The temperature drop from the hot spot to the extreme forward end of the furnace channel and in the glass in the throat passage tends to produce forward movement of the glass to and through the throat and this is aided by the pull on the glass created by the outflow or other removal of glass from the condition chamber. There will be certain localized convection currents as indicated by the curved arrows in the zone 55 above the level of the throat passage at the extreme front end of the furnace channel. There will be return currents in the lower layers of glass rearwardly to the glass in the doghouse as indicated by direction arrows in Fig. 2, this to compensate for the forwardly moving upper layer of glass from the doghouse to the hot spot and the forward outflow movement of fined glass to and through the submerged throat passage 10. Forward propulsion of surface glass from the doghouse and charging end of the furnace to the hot spot and carrying of the charged batch forward with this forwardly moving surface glass permits selection and use of a temperature down-gradient toward the charging end suitable for satisfactory batch melting and glass fining results and yet sufficiently economical in the use of fuel to make the glass making operation in the small capacity, unit size furnace of the invention competitive with the prior large capacity furnaces.

The illustrative embodiment of the invention shown in the drawings and particularly described herein may be modified and altered in ways which will now be obvious to those skilled in the art and I, therefore, do not wish to be limited to the details of this embodiment.

I claim:

1. Glass making apparatus comprising a relatively long and narrow batch melting and glass fining channel having a ratio of length to width within the limits of 4 and 7 and adapted to contain a bath of molten glass, a doghouse at one end of the channel in glass flow communication therewith, means providing a restricted subsurface outflow passage for glass at the opposite end of the channel, a furnace superstructure cooperative with said channel to provide an enclosed heating space overlying the glass in the channel and including a stack at the doghouse end of the channel for exhaust of gases from said space, heating means including individually adjustable fuel burners spaced at intervals along the sides of said heating space throughout substantially the full length thereof to fire into said heating space to effect heating of the glass in the channel and of the batch added thereto suitably for melting of the batch in a zone extending from the doghouse for approximately half of the length of the channel and fining of the newly melted glass in a zone extending for the remainder of said length and so that a temperature down-gradient is provided at the surface of the bath from a maximum temperature at a point adjacent the outflow passage end of the channel to a minimum temperature at the doghouse end of the channel, manually adjustable individual fuel supply valves for controlling the supply of fuel to the respective burners, control means operatively connected to a plurality of said valves and responsive to a change of temperature from a predetermined temperature at a reference point in said heating space automatically to make a corrective adjustment of the connected valves in unison while maintaining existing differentials between them as determined by their manual adjustments, and means acting locally in the surface portion of the glass in the doghouse to apply thereto a force effective to overcome the tendency to longitudinal convection movement of surface glass created by said temperature down-gradient and instead to cause a movement of glass at the surface of the bath and of the batch added thereto out of the doghouse and longitudinally of the channel toward the glass outflow end thereof.

2. Glass making apparatus comprising a relatively long and narrow batch melting and glass fining channel having a ratio of length to width within the limits of 4 and 7 and adapted to contain a bath of molten glass, a doghouse at one end of the channel in glass flow communication therewith, means providing a restricted subsurface outflow passage for glass at the opposite end of the channel, a furnace superstructure cooperative with said channel to provide an enclosed heating space overlying the glass in the channel and including a stack at the doghouse end of the channel for exhaust of gases from said space, heating means including individually adjustable fuel burners spaced at intervals along the sides of said heating space throughout substantially the full length thereof to fire into said heating space to effect heating of the glass in the channel and of the batch added thereto suitably for melting of the batch in a zone extending from the doghouse for approximately half of the length of the channel and fining of the newly melted glass in a zone extending for the remainder of said length and so that a temperature down-gradient is provided at the surface of the bath from a maximum temperature at a point adjacent to the outflow passage end of the channel to a minimum temperature at the doghouse end of the channel, independently manually adjutable fuel supply valves for controlling the supply of fuel to the individual burners, means for automatically effecting a corrective adjustment in unison of all the manually adjusted valves for the burners firing into the fining zone portion of the heating space in response to a departure from a predetermined temperature at a reference point in that zone and for automatically effecting a similar corrective adjustment in unison of all the manually adjusted valves for the burners firing into the melting zone in response to a departure from a predetermined temperature at a reference point in said melting zone, and means acting locally in the surface portion of the glass in the doghouse to apply thereto a force effective to overcome the tendency to longitudinal convection movement of surface glass created by said temperature down-gradient and instead to cause a movement of glass at the surface of the bath and of the batch added thereto out of the doghouse and longitudinally of the channel toward the glass outflow end thereof.

3. The method of making glass which comprises adding batch to a bath of molten glass of a predetermined substantially uniform depth in a horizontal relatively long and narrow batch melting and glass fining channel at one end of said channel to compensate for outflow of glass from the bath at the opposite end of the channel, applying heat to the glass bath by causing individually regulable burners to fire into the channel at points spaced along the channel throughout substantially its entire length and exhausting waste products of combustion from the burners and gases from the channel at the end of the channel at which batch is added to provide a temperature down-gradient at the surface of the bath extending longitudinally thereof from a point of maximum temperature adjacent to the second named end of the channel to a point of low temperature at its first named end, said heat being adequate for melting of the added batch in a zone extending from the first named end of the channel for approximately half its length and for fining of the newly melted glass in a zone extending for the remainder of the channel length, and applying to the glass at the surface of the bath at the first named end of the channel a force effective to overcome a tendency to convection movement of such surface glass from the point of maximum temperature to the first named end of the channel and to cause instead a reverse surface movement of the glass and of batch added thereto.

4. The method of making glass in a tank type furnace having a relatively long and narrow horizontal channel provided with a doghouse opening into one end thereof and with a restricted glass outflow passage at its opposite end and in which a bath of molten glass of a predetermined substantially uniform depth having a portion extending into the doghouse is constantly maintained, comprising the steps of delivering batch onto the portion of the glass bath in the doghouse to compensate for outflow of glass through the restricted passage, applying to the glass in the channel heating media from individually regulable burners firing into the channel at points spaced along the channel throughout substantially its entire length and exhausting spent heating media from the channel at the doghouse end thereof to provide a temperature gradient decreasing from a point adjacent to the second named end of the channel to the doghouse end thereof and adequate to effect melting of the added batch in a zone extending from the doghouse end for approximately half the length of the channel and fining of the newly melted glass in a zone extending for the remaining approximate half portion thereof, and propelling surface glass of the bath and batch carried thereby from the doghouse in a direction extending longitudinally of the channel through the melting zone and in the fining zone toward said point of maximum temperature so as to overcome and reverse the tendency of said temperature gradient to cause a convection flow of surface glass toward the doghouse.

References Cited in the file of this patent

UNITED STATES PATENTS

| | | |
|---|---|---|
| 1,610,377 | Hitner | Dec. 14, 1926 |
| 1,639,657 | Mantle | Aug. 23, 1927 |
| 1,894,249 | Williams | Jan. 10, 1933 |
| 1,937,321 | Howard | Nov. 28, 1933 |
| 1,953,023 | Mulholland | Mar. 27, 1934 |
| 1,970,094 | Honiss | Aug. 14, 1934 |
| 1,991,331 | Morton | Feb. 12, 1935 |
| 1,999,762 | Howard | Apr. 30, 1935 |
| 2,081,595 | McIntosh | May 25, 1937 |
| 2,533,826 | Lyle | Dec. 12, 1950 |
| 2,593,197 | Rough | Apr. 15, 1952 |